3,278,371
METHODS FOR CONTROLLING PESTS AND FUNGI WITH POLYISONITRILES
Ivar Ugi and Uwe Fetzer, Leverkusen, Ferdinand Grewe, Burscheid, Wolfgang Behrenz, Wuppertal-Elberfeld, Paul-Ernst Frohberger, Burscheid, Bernhard Homeyer, Opladen, Hans Scheinpflug, Leverkusen, and Gunter Unterstenhofer, Opladen, Germany, assignors to Farbenfabriken Bayer Aktiengesellschaft, Leverkusen, Germany, a German corporation
No Drawing. Filed Nov. 27, 1963, Ser. No. 326,349
Claims priority, application Germany, Dec. 17, 1962, F 38,572
9 Claims. (Cl. 167—30)

The present invention concerns the use of novel polyfunctional isonitriles for the control of pests on plants and animals. The production of such polyisonitriles is the object of application Serial No. 264,707, filed Mar. 12, 1963.

It has already been disclosed that aliphatic, cycloaliphatic and araliphatic monoisonitriles with 13-25 carbon atoms possess insecticidal activities (United States Patent No. 3,012,932).

It has now been found that polyisonitriles of the general formula

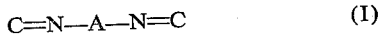

wherein A denotes an organic radical which may optionally contain 1-2 isonitrile groups, exhibit strong biocidal activities and may for this reason be employed as pest controlling agents.

It is distinctly surprising that the polyisonitriles according to the invention should have a considerably better insecticidal activity that the aliphatic, cycloaliphatic and araliphatic isonitriles with 13-25 carbon atoms known in technology at the present time. This superiority is also indicated in the examples given below.

The polyisonitriles according to the invention are characterised by the above stated Formula I. In this formula, A preferably represents aliphatic, cycloaliphatic and aromatic, araliphatic or heterocyclic bivalent radicals which may optionally contain 1-2 other isonitrile groups. These radicals may be substituted. In that case, they preferably contain one or more of the following groups:

Halogen, particularly chlorine; the nitro, carboxy, carboxylic acid ester, carboxylic acid amide and nitrile group; alkoxy, aryloxy, alkylmercapto, arylmercapto, alkyl- and aryl-sulphone as well as sulphonic acid and sulphonamide radicals; also acylamino and dialkylamino and finally alkyl-cycloalkyl, aralkyl and aryl radicals.

In addition, A represents two or more of the alpihatic, cycloaliphatic, aromatic, araliphatic and heterocyclic radicals where these radicals are linked by bridges of the following types:

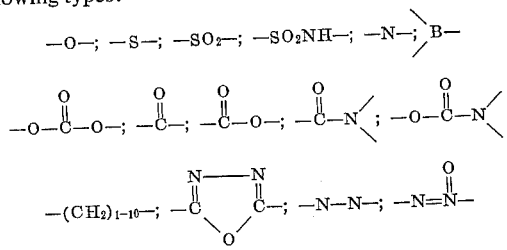

The following may be detailed as examples of the polyisonitriles according to the invention:

1,6-hexane and 1,4-cyclohexane diisocyanide; 1-methyl-1-isocyano-4-(2'-isocyano-2'-propyl)-cyclohexane; m- and p-phenylene, 2,4-, 2,5-, 2,6-toluylene, 2,4-dimethyl-1,3-phenylene, 2,4,6-trimethyl-1,3-phenylene, 2-methyl-4,6-diethyl-1,3-phenylene, 5-nitro-1,3-phenylene and 2,4,6-triisopropyl-1,3-phenylene diisocyanide; 2,4-diisocyano-6-sec.butyl-(and -6-isooctyl-)-phenol as well as its methyl ether, crotonic acid ester and β,β-dimethyl-acrylic acid ester; tetrachloro-ω,ω'-p-xylylene diisocyanide; 1,5-naphthylene diisocyanide; ω,ω'-o-xylylene diisocyanide; 2,2'-diisocyanodiphenyl; 4,4'-diisocyano-diphenyl and the following substitution derivatives thereof: 3,3'-dimethyl, 3,3'-dimethoxy, 3,3'-diethoxy, 3,3'-dichloro, 2,2'-dinitro, 2,2'-dimethyl; 4,4'-diisocyano-diphenyl-sulphone; diisocyano-diphenyl-methane and the following substitution products thereof: 3,3'-dimethyl, 3,3'-diisopropyl; 3,3'-dimethyl-5,5'-dichloro, 3,3'-dimethyl-5,5'-diethyl, 3,3'-dimethoxy, 3,3',5,5'-tetraethyl, 3,3',5,5'-tetraisopropyl; 4,4'-diisocyano-dicyano-diphenyl-trichloro-methyl-methane; 4,4'-diisocyano-benzophenone; 4,4'-diisocyano-thiodiphenyl ether and -diphenyl disulphide; 1-(p-isocyanophenyl)-3,5-dimethyl-4-isocyano-pyrazole; triisocyano-mesitylene; 2,4,6-triisocyano-1,3,5-triisopropyl-benzene; 2,4,4'-triisocyano-diphenyl; triisocyano-triphenylamine; tri[2-methyl-2-isocyano-propyl-1] borate; and 2,2',4,4'-tetraisocyano-3,3',5,5'-tetramethyl-diphenyl-methane.

The polyisonitriles according to the invention have not hitherto been described. They can be prepared by treating formamides of the general formula

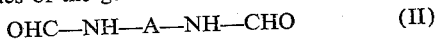

wherein A has the same significance as in Formula I with water-eliminating agents in the presence of tertiary bases. The polyisonitriles according to the invention are preferably prepared by reacting one mole of a formamide of the general Formula II, dissolved or suspended in an inert solvent, with an approximately equivalent amount of phosgene at −50 to +50° C. in the presence of a trialkyl-amine such as trimethylamine or triethylamine, by adding it to the reaction mixture. About 0.6 to 5 moles of the base are employed per mole of a formamide group for this purpose. The following are suitable as solvents: benzine, benzene, toluene, methylene chloride, chloroform, trichloroethylene ether, tetrahydrofuran, ethyl acetate and triethylamine.

It is convenient to pass the phosgene into the reaction mixture, optionally whilst under pressure. The phosgene may also be dissolved in an inert solvent and the solution then added dropwise.

Representative examples for the preparation of the polyisonitriles according to this process have been given in the experimental part.

The polyisonitriles according to the invention can be applied for the control of insects such as flies, mosquitoes, beetles and greenflies, mites and nematodes. They are equally suitable for the control of fungi, for instance phytopathogenic fungi.

The polyisonitriles according to the invention may be employed by themselves or as compositions made up by the usual method. The compositions may be suspensions, dispersions, powders or dusting powders. They are produced with the aid of the normal extenders, diluents and emulsifying agents. The superiority of the polyisonitriles according to the invention in comparison with the known monoisonitriles is demonstrated below by means of some examples.

The tests are carried out by the normal method. Fo this purpose, use is made of aqueous emulsions which ar prepared by taking up the active agent in an equal amoun of dimethylformamide and by diluting this concentrate solution with water to the desired concentration with th addition of an emulsifying agent.

In the following Table 1, the best of the isonitrile which has so far been described, i.e. n-dodecyl isocyanid is compared with some of the polyisonitriles according t the invention. The superior activity of the compoun according to the invention is clearly evident. In additio the superiority of the compounds according to the invention is indicated by comparisons of the systemic activity of 0.2% solutions on greenflies during a period of 8 days' activity. n-dodecyl isocyanide has a 50% destructive effect and n-octadecyl isocyanide has 0% destructive effect, whereas 2,4-toluylene diisocyanide and 2,4-diethyl-6-methyl-1,3-phenylene diisocyanide both have 100% activities.

TABLE 1

| Isonitrile | Aedes aegypti | | Calandra granaria, percent | | Gryllus domesticus, percent | |
|---|---|---|---|---|---|---|
| | Percent Conc. | TL100 | Conc. | Activity | Conc. | Activity |
| n-Dodecyl | 0.01 | 3ʰ | 0.1 | 90 | 0.1 | 0 |
| 2,4-toluylene di- | 0.01 / 0.001 | 60' / 3ʰ | 0.1 | 100 | 0.1 | 60 |
| 2,6-toluylene di- | 0.01 / 0.001 | 60' / 3ʰ | 0.1 | 100 | 0.1 | 100 |

During tests on spider mites (*Tetranychus telarius*, resistant) with the use of 0.2% solutions during a period of 48 hours' activity, the following results regarding the percentage destruction of the spider mites are obtained: n-dodecyl isocyanide 0%, 2,4-diethyl-6-methyl-1,3-phenylene diisocyanide 100%, 3,3'-dimethyl-5,5'-diethyl-diphenylmethane diisocyanide 100%, and di-(2-isocyano-2-methyl-1-propyl) carbonate 90%.

The superior activity of the polyisonitriles is evident from each of these comparisons.

The application of the polyisonitriles according to the invention towards various pests is illustrated below:

For instance, 2,4,6-triisopropyl-1,3-phenylene diisocyanide has a 95% lethal effect on nematodes (meloidogyne spec.) at a concentration of 0.02% (mixed with the soil).

0.05% solutions of 1,4-cyclohexane diisocyanide reduce the degree of infestation of *Piricularia oryzae* on rice to 25% of the infestation on an untreated control.

The fungicidal activity of some isonitriles was tested on *Phytophthora infestans* (P.i.) upon tomatoes and on *Erysiphe* spec. (E.s.) upon cucumbers. After treatment with 0.025% isonitrile solutions, the degree of infestation is reduced to the percentages state in brackets: 1,3-diisocyano-2,4-diethyl-6-methyl-benzene (P.i.: 55; E.s.: 40); di-(2-isocyano-2-methyl-1-propyl) carbonate (P.i.: 0.3; E.s.: 15); 4,4'-diisocyano-3,3'-dimethyl-5,5'-diethyl-diphenylmethane (P.i.: 41; E.s.: 0).

During tests on disease-causing organisms living in seeds and in the soil, 0.01% solutions of 2,4- and 2,6-toluylene diisocyanide cause complete inhibition of growth for *Corticium rolfsii, Sclerotinia sclerotiorum, Verticillium albo-atrum, Thielaviopsis basicola, Phytophthora cactorum, Fusarium culmorum, Fusarium oxysporum, Fusarium solani* and *Fusarium pisi*, and they prevent spore germination of *Tilletia tritici*.

The polyisonitriles according to the invention may also be employed for the control of pests on plants in the form of spray agents. Some results of this kind of application are reproduced in the following Table 2.

TABLE 2

| Isonitrile (in the form of a spray agent) | Conc., percent | Caterpillars Plutella maculipennis, 4 days, percent | Drosophila, 24 hours, percent |
|---|---|---|---|
| 2,4-diethyl-6-methyl-1,3-phenylene di- | 0.2 / 0.02 | 100 | 100 / 60 |
| Di-(2-isocyano-2-methyl-1-propyl) carbonate | 0.2 | 60 | |
| 3,3',5,5'-tetraethyldiphenyl-methane 4,4'-di- | 0.2 | 100 | |
| 2,4,6-triisopropyl-2,3-phenylene di- | 0.2 / 0.02 | 100 / 100 | 100 / 40 |

TABLE 3

(1) Activity of polyisonitriles towards *Tetranychus telarius* (green, resistant; percent destruction):

| Isonitrile | Concentration, p.p.m. | | Ovicidal |
|---|---|---|---|
| | 2,000 | 200 | |
| 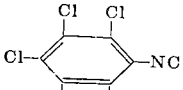 | 90 | 0 | + |
| 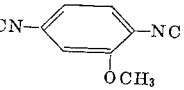 | 100 | 100 | − |
| 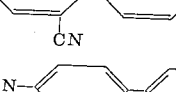 | 100 | 98 | − |
| 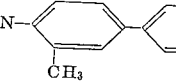 | 100 | 100 | − |
| 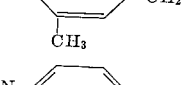 | 100 | 100 | − |
| 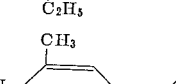 | 100 | 98 | − |
| 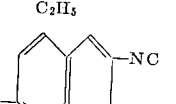 | 100 | 100 | − |
| 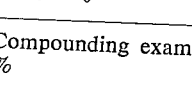 | 100 | 90 | + |
| 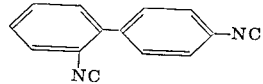 | 100 | 100 | − |

Compounding example:

50% 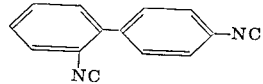

2% dispersing agent (alkylarylsulfonate)
3% lignin sulfate
5% silicic acid (synthetic)
40% silicic acid (natural origin)

Test on resistant *T. telarius* in meadow bog:

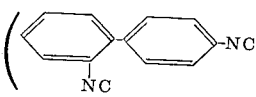

| | Percent active agent | 48 hours/percent destruction | 8 days, degree of infestation |
|---|---|---|---|
| Above composition | 0.02 | 100% | 0% |
| | 0.01 | 100% | 10% |
| | 0.005 | 95% | 40% |
| Pure active agent | 0.02 | 100% | 10% |
| | 0.01 | 90% | 40% |
| | 0.005 | 50% | 70% |
| Control | | 0% | 100% |

(2) Activity of polyisonitriles towards *Eriophyes ribis* (percent destruction):

| Active agent | Concentration, p.p.m. | Activity, percent |
|---|---|---|
| 1,2,4-triisopropyl-3,6-di(isonitrile)benzene [(CH₃)₂CH-C₆H(CH(CH₃)₂)(CH(CH₃)₂)(CN)(NC)] | 1.6 | 90 |
| bis(4-isonitrilo-3-methyl-5-ethylphenyl)methane [CN-C₆H₂(CH₃)(C₂H₅)-CH₂-C₆H₂(CH₃)(C₂H₅)-NC] | 40 | 95 |
| Largan (Endrin) (as comparison) | 1.6 | 80 |

(3) Activity of polyisonitriles towards Oriental cockroaches (percent destruction):

| Isonitrile | Concentration, percent | |
|---|---|---|
| | 0.1 | 0.01 |
| CN—CH₂CH₂—NC | 60 | 0 |
| 3,4-dimethylphenyl isonitrile with CN [CH₃-C₆H₂(CH₃)(CN)-NC] | 100 | 0 |

(4) Systemic activity towards Rhopalosiphon spec. (8 days, percent destruction):

| Isonitrile | Concentration, 0.2% |
|---|---|
| CN—(CH₂)₄—NC | 100 |
| CN-C₆H₃(C₂H₅)-CH₂-C₆H₃(C₂H₅)-NC | 100 |

(5) Activity of polyisonitriles towards *M. persicae* (percent destruction):

| Isonitrile | Concentration, p.p.m. | |
|---|---|---|
| | 2,000 | 200 |
| biphenyl-2,4'-diisonitrile | 90 | 40 |

(6) Activity of polyisonitriles towards Drosophila (percent destruction):

| Isonitrile | Concentration, p.p.m. | |
|---|---|---|
| | 2,000 | 200 |
| C₆H₄(CN)(NC) (ortho) | 100 | 0 |
| CN-C₆H₄-NC (para) | 100 | 0 |
| C₆H₃(CN)(CH₃)(NC) | 100 | 0 |
| CH₃-C₆H₂(CH₃)(CN)-NC | 100 | 93 |
| C₂H₅-C₆H₂(CH₃)(CN)(C₂H₅)-NC | 100 | — |
| (CH₃)₂CH-C₆H₂(CH(CH₃)₂)(CN)-NC | 100 | 40 |

(7) Activity of polyisonitriles toward *Plutella maculipennis* (percent destruction):

| Isonitrile | Concentration, p.p.m. | | |
|---|---|---|---|
| | 1,000 | 100 | 40 |
| (CH₃)₂CH-C₆H₂(CH(CH₃)₂)(CN)(CH(CH₃)₂)-NC | 100 | 100 | 50 |

(8) Activity of polyisonitriles towards Pseudococcus spec.:

| Isonitrile | Percent destruction at 1,000 p.p.m. |
|---|---|
| (CH₃)₂CH-C₆H₂(CH(CH₃)₂)(CN)(CH(CH₃)₂)-NC | 100 |

(9) Activity of polyisonitriles toward *Piricularia oryzae* (infestation; untreated control 100%):

| Isonitrile | Spray liquor, 0.05% | Dusting agent, 0.1% |
|---|---|---|
| 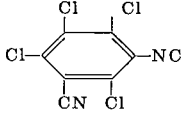 | 0 | 25 |
| 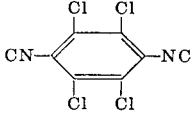 | 2 | 0 |
| 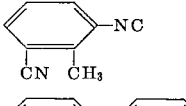 | 5 | 8 |
| 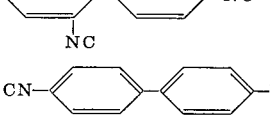 | 0 | 0 |
| 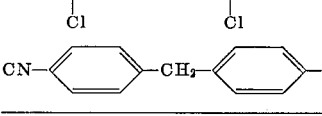 | 6 | 6 |
| 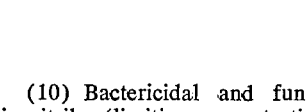 | 0 | 3 |

(10) Bactericidal and fungicidal activity of polyisonitriles (limiting concentration in p.p.m. for total spore inhibition):

| Isonitrile | Aspargillus | Coli | Proteus | Glycerinaceae | Fluoresans | Candida |
|---|---|---|---|---|---|---|
| 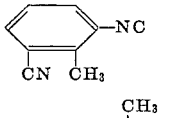 | 25 | 38 | 12 | | | |
| 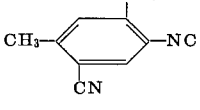 | 77 | 10 | 50 | 10 | 10 | 18 |

(11) Nematicidal activity of polyisonitriles towards Meloidogyne spec.:

| Isonitrile | Percent destruction at a concentration of 200 p.p.m. of active agent |
|---|---|
| (CN—C(CH₃)₂CH₂O)₂CO | 95 |
| 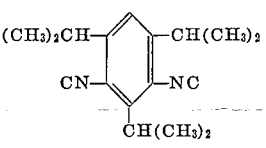 | 95 |

(12) Activity of polyisonitriles towards *Fusicladium dendr.* (inhibition of spore germination of slides, 0=total inhibition, V=untreated control):

| Isonitrile | Spore germination at a concentration of 1 p.p.m. of active agent |
|---|---|
| 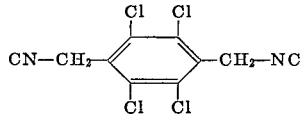 | 0 |
| 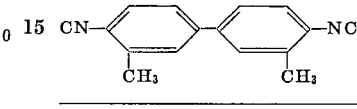 | 1 |

(13) Activity of polyisonitriles towards *Phythophthora infestans* (on tomatoes; percent infestation):

| Isonitrile | Concentration in p.p.m. | | | Comparison with standard |
|---|---|---|---|---|
| | 250 | 62 | 31 | |
| (CN—C(CH₃)₂CH₂O)₂CO | 0.3 | 33 | ---- | + |
| 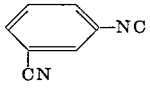 | 8 | 33 | 71 | = |
| 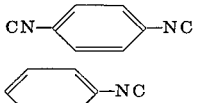 | 16 | 40 | 76 | (=) |
| 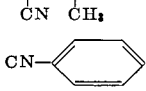 | 21 | ---- | ---- | = |
|  | 0 | 2 | 19 | + |

(14) Activity of polyisonitriles towards Erysiphe spec. (on cucumbers; percent infestation):

| Isonitrile | Concentration in p.p.m. | | | Comparison with standard |
|---|---|---|---|---|
| | 250 | 62 | 31 | |
| 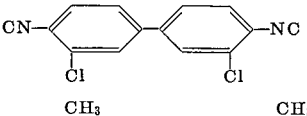 | 0 | 0 | 10 | = |
| 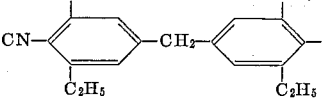 | 0 | 10 | 25 | = |
| 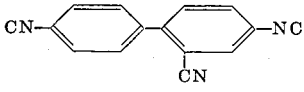 | 0 | 5 | 18 | = |

(15) Activity of polyisonitriles towards *Tilletia tritici* (spore germination: 0=complete inhibition; V=no inhibition; 1 g. of dry seed dressing per kg. of seed material):

| Isonitrile | Percent in dry seed dressing | | | |
|---|---|---|---|---|
| | 30 | 10 | 3 | 1 |
| 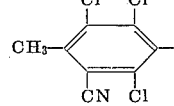 | 0 | --- | --- | --- |
| 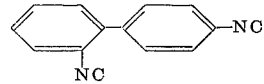 | 0 | II | II | II |

(16) Fungicidal and fungistatic activity of polyisonitriles towards disease-causing organisms living in seeds and the soil (agar-agar plate test: inhibition of mycelium growth at the concentrations expressed in p.p.m.):

| Isonitrile | *Corticium rolfsii* | *Sclerotinia sclerotiortum* | *Verticillium albo-atrum* | *Thielaviopsis basicola* | *Phytophthora cactorum* | *Fusarium culmorum* | *Fusarium oxysporum* | *Fusarium solani f. pisi* |
|---|---|---|---|---|---|---|---|---|
| CN—CH₂CH₂—NC | 10 | 100 | 100 | 100 | 100 | 100 | 100 | 100 |
| 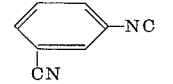 | 10 | 100 | 100 | 10 | 10 | 100 | 100 | 100 |
| 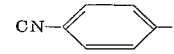 | 10 | 100 | 100 | 10 | 10 | 100 | 100 | 100 |
| 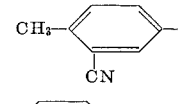 | 10 | 100 | 100 | 100 | 100 | 100 | 100 | 100 |
| 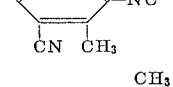 | 100 | 100 | 100 | 100 | 100 | 100 | 100 | 100 |
| 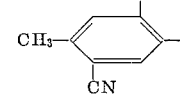 | 10 | 10 | 10 | 10 | 10 | 100 | 100 | 100 |

(17) Toxicity of polyisontriles toward warm-blooded creatures (largest dose which is survived, in mg./kg. (mouse)):

| Compound | Per-oral | Sub-cutaneous |
|---|---|---|
| CN—CH₂CH₂—NC | 250 | 100 |
| CN—(CH₂)₆—NC | 250 | 50 |
| 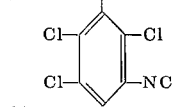 | 250 | 100 |
| 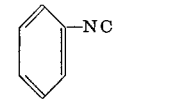 | 2,000 | 1,000 |
| 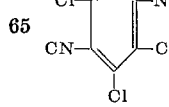 | 250 | 50 |
| 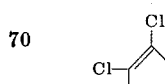 | 250 | 50 |
| 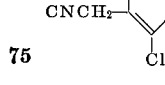 | 1,000 | 100 |
| (p-methoxy-m-cyanophenyl isonitrile) | 2,000 | 1,000 |
| (tetrachloro methylphenyl diisonitrile) | 5,000 | 1,000 |
| (pentachlorophenyl isonitrile) | 5,000 | 1,000 |
| (tetrachloro-bis(isocyanomethyl)benzene) | 1,000 | 1,000 |

| Compound | Per-oral | Subcutaneous |
|---|---|---|
| naphthalene-1,5-diisocyanide (CN, NC on naphthalene) | 1,000 | 500 |
| naphthalene-1,4-diisocyanide | 2,000 | 250 |
| biphenyl-2,4'-diisocyanide | 1,000 | 1,000 |
| biphenyl-4,4'-diisocyanide | 1,000 | 1,000 |
| 3,3'-dichloro-biphenyl-4,4'-diisocyanide | 500 | 1,000 |
| CN—C$_6$H$_3$(CH$_3$)—CH$_2$—C$_6$H$_3$(CH$_3$)—NC | 50 | 100 |
| CN—C$_6$H$_3$(C$_2$H$_5$)—CH$_2$—C$_6$H$_3$(C$_2$H$_5$)—NC | 100 | 100 |
| CN—C$_6$H$_2$(C$_2$H$_5$)(CH$_3$)—CH$_2$—C$_6$H$_2$(C$_2$H$_5$)(CH$_3$)—NC | 5,000 | 1,000 |
| CN—C$_6$H$_3$(CH(CH$_3$)$_2$)—CH$_2$—C$_6$H$_3$(CH(CH$_3$)$_2$)—NC | 5,000 | 1,000 |
| CN—C$_6$H$_3$(OCH$_3$)—CH$_2$—C$_6$H$_3$(OCH$_3$)—NC | 5,000 | 1,000 |
| CN—C$_6$H$_3$(C$_2$H$_5$)—S—C$_6$H$_3$(C$_2$H$_5$)—NC (with CH$_3$) | 5,000 | 1,000 |
| CN—C$_6$H$_3$(C$_2$H$_5$)(CH$_3$)—S—S—C$_6$H$_3$(C$_2$H$_5$)(CH$_3$)—NC | 150 | 50 |
| 1,5-diisocyano-anthraquinone | 1,000 | 1,000 |
| CN—C$_6$H$_4$—O—CO—O—C$_6$H$_4$—NC | 1,000 | 1,000 |
| 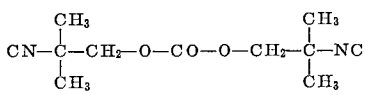 (CN—C$_6$H$_3$(CH$_3$)—O—CO—O—C$_6$H$_3$(CH$_3$)—NC) | 1,000 | 1,000 |
|  (3,3'-dichloro variant with O—CO—O bridge) | 1,000 | 1,000 |

The following examples are given for the purpose of illustrating the invention.

*Example 1*

$$CN-\underset{CH_3}{\underset{|}{\overset{CH_3}{\overset{|}{C}}}}-CH_2-O-CO-O-CH_2-\underset{CH_3}{\underset{|}{\overset{CH_3}{\overset{|}{C}}}}-NC$$

254 parts by weight of 2-methyl-2-N-formylamino-1-propanol (obtainable from the corresponding aminoalcohol and the stoichiometric amount of formic acid by distilling off with toluene the water produced by the reaction; M.P. 67–70° C.), 800 parts by weight of triethylamine and 1500 parts by weight of methylene chloride are introduced first of all. 100 parts by weight of phosgene are passed in whilst cooling with ice and stirring, and it is subsequently heated under reflux for 1 hour. Another 200 parts by weight of phosgene are thereafter passed in 0–15° C., the reaction is allowed to go to completion at 30–40° C. for 10 minutes, dry air is passed in for 10 minutes, 2000 parts by weight of water are added, the organic phase is separated, dried over anhydrous potassium carbonate, evaporated in vacuo, and the residue is distilled in vacuo. B.P. 120–125° C./0.04 mm. Hg; M.P. 114–115° C. Yield: 37 parts by weight of di-(2-isocyano-2-methyl-1-propyl) carbonate.

*Example 2*

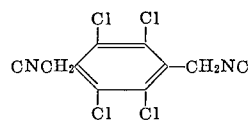

850 parts by weight of 1,4-diformylamino-cyclohexane (available by reacting quinoid hexahydro-1,4-phenylene diamine and formic acid in chlorobenzene and distilling off the water produced by the reaction; M.P. 200–202° C.), 2500 parts by weight of triethylamine and 5000 parts by weight of methylene chloride are introduced first of all. 100 parts by weight of phosgene are passed in whilst stirring and cooling with ice, the product is treated with 2000 parts by weight of water, the organic phase is separated, dried over anhydrous potassium carbonate and evaporated in vacuo. Yield: 540 parts by weight of crude cyclohexane 1,4-diisocyanide of M.P. 78–85° C. Purification by recrystallisation from methanol or benzine or by distillation in vacuo (B.P. 115–120° C./0.1 mm. Hg; M.P. 92–94° C.).

*Example 3*

$$CNCH_2-\underset{Cl\ Cl}{\overset{Cl\ Cl}{C_6(Cl)_4}}-CH_2NC$$

99 parts by weight of phosgene are passed into a mixture of 165 parts by weight of ω,ω'-diformylamino-2,3,5,6-tetrachloro-p-xylene, 222 parts by weight of triethylamine and 1500 parts by weight of methylene chloride at 0–5° C. during one hour whilst stirring, it is heated to boiling for ½ hour whilst blowing nitrogen through it, and is then treated with ice-water. The phases are separated, the organic phase is washed twice with water, dried over anhydrous sodium sulphate and evaporated in vacuo. After recrystallisation from toluene/ligroin, 52 parts by weight of ω, ω'-diisocyano-2,3,5,6-tetrachloro-p-xylene of M.P. 189–190° C. are obtained.

*Example 4*

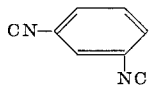

260 parts by weight of diformyl-m-phenylene diamine, 750 parts by weight of triethylamine and 1500 parts by weight of methylene chloride are introduced first of all and reacted with 320 parts by weight of phosgene. The product is separated after 1500 parts by weight of water have been added, evaporated in vacuo at 20–30° C. and recrystallised from benzine/ethyl acetate. Yield: 110 parts by weight of m-phenylene diisocyanide, M.P. 75–78° C.

*Example 5*

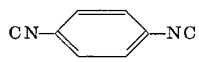

164 parts by weight of diformyl-p-phenylene diamine, 500 parts by weight of triethylamine and 1000 parts by weight of methylene chloride are introduced first of all. 200 parts by weight of phosgene are passed in at 0–15° C. whilst stirring. After the addition of 1000 parts by weight of water the product is separated, dried over potassium carbonate and evaporated in vacuo at 20–30° C. Yield: 98 parts by weight of crude p-phenylene diisocyanide; decomp. from 100° C. onwards.

*Example 6*

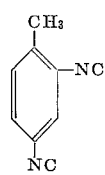

800 parts by weight of phosgene are passed into a suspension of 710 parts by weight of 2,4-toluylene diformamide (which can be prepared from 2,4-toluylene diamine and formic acid by the usual method) in 1100 parts by weight of anhydrous trimethylamine and 4000 parts by weight of chloroform with the aid of a reflux condenser cooled to −25° C. and whilst stirring. After 3 hours, it is treated with 3000 parts by weight of water, separated, dried over anhydrous potassium carbonate, filtered and evaporated in vacuo at 20–30° C. The residue is purified by recrystallisation from methanol or benzine. Yield: 191 parts by weight of 2,4-toluylene diisocyanide. M.P. 87.5–88.5° C.

*Example 7*

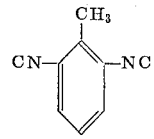

675 parts by weight of 2,6-toluylene diformamide (obtainable by the usual method when 2,6-toluylene diamine is heated with 90% formic acid), 1800 parts by weight of triethylamine and 4000 parts by weight of methylene chloride are introduced first of all. 760 parts by weight of phosgene are passed in whilst cooling with ice and stirring, the reaction is allowed to go to completion at 30–40° C. for 5 min., dry air is passed through for 10 min., the product is treated with 3000 parts by weight of water, separated, dried with anhydrous sodium sulphate and evaporated in vacuo at 20–30° C. Yield: 468 parts by weight of crude 2,6-toluylene diisocyanide which can be purified by recrystallisation from benzine. Yield: 235 parts by weight. M.P. 84–86° C.

*Example 8*

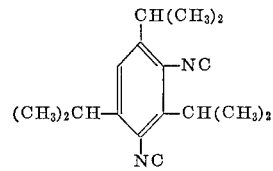

290 parts by weight of finely ground 1,3-diformylamino-2,4,6-triisopropyl-benzene (available from 2,4,6-triisopropyl-1,3-phenylene diamine by heating under reflux with 98% formic acid for 10 hours; M.P. 272–275° C.) are suspended in 500 parts by weight of triethylamine and 1000 parts by weight of methylene chloride. 210 parts by weight of phosgene are passed in at 5–15° C. whilst stirring, and it is subsequently heated at 30–40° C. for 5–10 min. After a vigorous current of nitrogen has been passed in for 10–15 min., the product is treated with 1500 parts by weight of water, separated, dried over anhydrous magnesium sulphate, filtered and evaporated in vacuo at 20–30° C. The residue is fractionally distilled in a high vacuum. B.P. 130–135° C./0.25 mm. Hg; M.P. 59–61° C. Yield: 168 parts by weight of 2,4,6-triisopropyl-1,3-phenylene diisocyanide.

*Example 9*

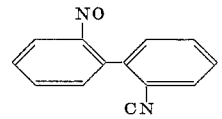

80 parts by weight of phosgene are passed into a mixture of 96 parts by weight of 2,2'-diformylamino-diphenyl, 1100 parts by weight of methylene chloride and 370 parts by weight of triethylamine at 0–5° C. for one hour whilst stirring, it is heated to boiling for ½ hour whilst blowing nitrogen through it, and is then treated with ice-water. The phases are separated, the organic phase is washed twice with water, dried over anhydrous sodium sulphate and evaporated in vacuo. 24 parts by weight of 2,2'-diisocyano-diphenyl of M.P. 95–97° C. are obtained after recrystallising three times from benzine.

*Example 10*

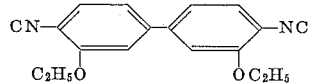

A solution of 39 parts by weight of phosgene in 50 parts by weight of methylene chloride is added dropwise to a mixture of 63 parts by weight of N,N'-diformyl-3,3'-diethoxy-benzidine (obtainable from the corresponding diamine and formic acid by boiling under reflux; M.P. 205–206° C.), 100 parts by weight of triethylamine and 300 parts by weight of methylene chloride whilst cooling with ice. After 200 parts by weight of water have been added, the product is separated, dried over anhydrous potassium carbonate, filtered, evaporated in vacuo at 20–40° C. and recrystallised from toluene-benzine. Yield: 22 parts by weight of 4,4'-diisocyano-3,3'-diethoxy-diphenyl. M.P. 140–141° C.

*Example 11*

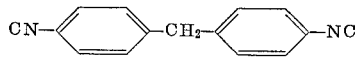

410 parts by weight of phosgene are passed into a suspension of 436 parts by weight of 4,4'-diformylamino-diphenylmethane in 900 parts by weight of triethylamine and 2000 parts by weight of methylene chloride whilst stirring and cooling with ice. When the reaction has gone to completion at about 30° C., dry air is passed through, the product is treated with 1500 parts by weight of water, separated and evaporated in vacuo at 20–30° C. Yield: 345 parts by weight of crude 4,4'-diphenyl-methane diisocyanide of M.P. 95–115° C. M.P. 125–128° C. after recrystallisation from ethyl acetate.

*Example 12*

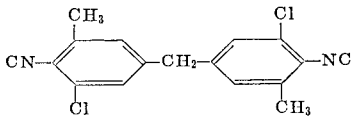

37.1 parts by weight of phosgene are passed into a mixture of 64 parts by weight of 4,4'-diformylamino-3,3'-dimethyl-5,5'-dichloro-diphenylmethane, 81 parts by weight of triethyl-amine and 750 parts by weight of methylene chloride at 0–5° C. during one hour whilst stirring, it is heated to boiling for ½ hour whilst blowing nitrogen through, and then treated with ice-water. The phases are separated, the organic phase is washed twice with water, dried over anhydrous sodium sulphate and evaporated in vacuo. 31 parts by weight of 4,4'-diisocyano-3,3'-dimethyl-5,5'-dichloro-diphenyl-methane of decomp. point 160–165° C. are obtained after recrystallisation from isopropanol.

*Example 13*

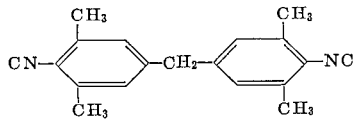

44.2 parts by weight of phosgene are passed into a mixture of 68 parts by weight of 4,4'-diformylamino-3,3', 5,5'-tetramethyl-diphenylmethane, 91 parts by weight of triethylamine and 750 parts by weight of methylene chloride at 0–5° C. during one hour whilst stirring, it is heated to boiling for ½ hour whilst blowing nitrogen through, and then treated with 1000 parts by weight of ice-water. The phases are separated, the organic phase is washed twice with water, dried over anhydrous sodium sulphate and evaporated in vacuo. 44 parts by weight of 4,4'-diisocyano-3,3',5,5'-tetramethyl-diphenylmethane of M.P. 208–212° C. (decomp.) are obtained after recrystallisation from benzine.

*Example 14*

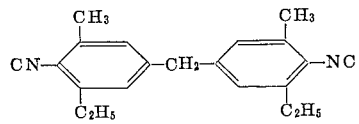

1185 parts by weight of 4,4'-diformylamino-3,3'-dimethyl-5,5'-diethyl-diphenylmethane (available from the corresponding diamine by heating with 90% technical formic acid; M.P. 335–336° C.) are suspended in 1600 parts by weight of triethylamine and 5000 parts by weight of methylene chloride. 700 parts by weight of phosgene are passed in whilst stirring and cooling with ice (internal temperature 20° C.). Nitrogen is blown through after the product has been left at 30–40° C. for 5 min., it is treated with 2000 parts by weight of water, separated, dried over anhydrous potassium carbonate, filtered and evaporated in vacuo at 20–40° C. Residue: 979 parts by weight of crude 4,4'-diisocyano-3,3'-dimethyl-5,5'-diethyl-diphenylmethane of M.P. 110–116° C. M.P. 127–128° C. after recrystallisation from ethanol or ethyl acetate.

*Example 15*

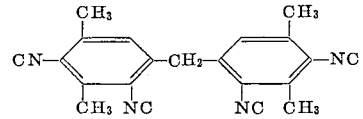

394 parts by weight of 2,2'-,4,4'-tetraformylamino-3,3', 5,5'-tetramethyl-diphenylmethane (available from 2,4-diamino-1,3-xylene by condensation with formaldehyde in boiling aqueous alcohol in the presence of about 20 mole percent of hydrochloric acid and subsequent formylation in boiling formic acid), 1000 parts by weight of triethyl-amine and 2000 parts by weight of dioxan are introduced first of all. 410 parts by weight of phosgene are passed in at 0–15° C. whilst stirring. The reaction is allowed to go to completion at 30–40° C., dry air is passed through, and the product is treated with 2000 parts by weight of water. After separating, drying over potassium carbonate, filtering and evaporating in vacuo at 15–25° C., 400 parts by weight of amorphous crude 3,3',5,5'-tetramethyldiphenyl 2,2',4,4'-tetraisocyanide are obtained.

*Example 16*

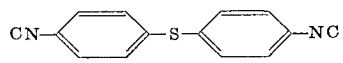

272 parts by weight of 4,4'-diformylamino-diphenyl thioether (obtainable from 4,4'-diamino-diphenyl thioether and boiling formic acid), 500 parts by weight of triethylamine and 1200 parts by weight of methylene chloride are introduced first of all. 200 parts by weight of phosgene are passed in, it is treated with 800 parts by weight of water, separated and evaporated in vacuo. Yield: 179 parts by weight of 4,4'-diisocyano-thiodiphenyl ether. Decomp. from 105° C. onwards.

*Example 17*

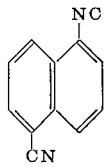

440 parts by weight of 1,5-diformylamino-naphthalene (M.P. 210–211° C., with decomp.) are suspended in 500 parts by weight of triethylamine and 1500 parts by weight of methylene chloride. 210 parts by weight of phosgene are passed in at 0–15° C. whilst stirring, it is heated at 30–40° C. for 5 min., dry compressed air is blown through, the product is treated with 2000 parts by weight of water, separated, dried over anhydrous potassium carbonate, filtered, evaporated in vacuo at 20–40° C., and the residue is recrystallised from benzene/benzine. Yield: 245 parts by weight of 1,5-naphthylene diisocyanide. M.P. 197–199° C.

*Example 18*

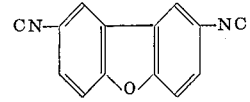

254 parts by weight of 2,7-diformylamino-dibenzofuran (available from the corresponding diamine and boiling formic acid), 500 parts by weight of triethylamine and 1000 parts by weight of chlorobenzene are introduced first of all. 200 parts by weight of phosgene are passed in at 0–15° C. whilst stirring, 800 parts by weight of water are added, the product is separated and evaporated in vacuo at 30–40° C. Yield: 158 parts by weight of 2,7-diisocyano-dibenzofuran. Decomp. at 96–99° C.

*Example 19*

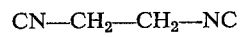

58 parts by weight of N,N'-diformyl-ethylene diamine, 250 parts by weight of triethylamine and 600 parts by weight of methylene chloride are introduced first of all. 100 parts by weight of phosgene are passed in, whilst stirring and cooling by means of a bath of ice and common salt, at a sufficiently fast rate for the temperature of the reaction mixture to amount to 5–15° C. It is subsequently heated at 30–40° C. for 10–15 minutes, a vigorous current of air is thereafter passed through it for 5–10 minutes, and it is treated with 1000 parts by weight of ice-water. The organic phase is separated, dried over anhydrous potassium carbonate and evaporated in vacuo at 20–30°C. The residue is distilled in a high vacuum. Yield: 20 parts by weight of ethylene diisocyanide. B.P. 65–70° C./0.005 mm. Hg.

If the 58 parts by weight of N,N'-diformyl-ethylene diamine are replaced by the equivalent amount of other starting products and the procedure is otherwise exactly in accordance with the specified directions, the isonitriles listed below are obtained at the yields stated in each case. Certain differences arise during the treatment of the resultant residues.

Therefore, separate details are given of these operations in each case. The structural formula of the compound is stated first of all, then the treatment of the residue and finally the yield.

(1)    CN—(CH$_2$)$_4$—NC

The residue is distilled in a high vacuum. Yield: 39 parts by weight of butane 1,4-diisocyanide. B.P. 100–105° C./0.1 mm. Hg.

(2)    CN—(CH$_2$)$_6$—NC

The residue is distilled in a high vacuum. Yield: 34 parts by weight of hexamethylene diisocyanide. B.P. 82–84° C./0.003 mm. Hg; $n_D^{20}$=1.4433.

(3) 

The residue consists of 156 parts by weight of a brittle resin which can be powdered, and according to its infrared spectrum it consists of crude reacemic 1,3-diisocyano-1,2-diphenylpropane.

(4) 

The residue is recrystallised from ligroin. Yield: 18 parts by weight of 1',3'-diisocyano-durene. M.P. 68–69° C.

(5) 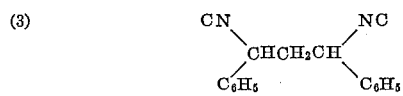

The residue is dissolved in absolute benzene, chromatographed over neutral Al$_2$O$_3$, and the solution is evaporated in vacuo at about 20° C. Yield: 20 parts by weight of crude o-phenylene diisocyanide.

(6) 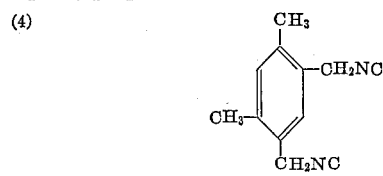

The residue is recrystallised from 600 parts by weight of ligroin. Yield: 56 parts by weight of 2,5-diisocyano-1,4-dimethyl-benzene. M.P. 105–107° C.

(7) 

The residue is triturated with ether, filtered off with suction and recrystallised from cyclohexane. Yield: 78 parts by weight of 2-methoxy-1,4-phenylene diisocyanide. M.P. 154–155° C. (decomp.).

(8) 

The residue is triturated with ether and filtered off with suction. Yield: 114 parts by weight of tetrachloro-m-phenylene diisocyanide. Decomp. from 100° C. onwards.

(9) 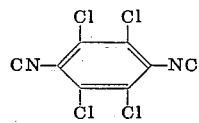

The residue is triturated with ether and filtered off with suction. Yield: 122 parts by weight of tetrachloro-p-phenylene diisocyanide. M.P. 182–184° C. (decomp.).

(10) 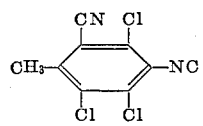

The residue is triturated with ethyl acetate and filtered off with suction. Yield: 113 parts by weight of 2,4,5-trichloro-6-methyl-1,3-phenylene diisocyanide. M.P. 112–116° C. (decomp.).

(11) 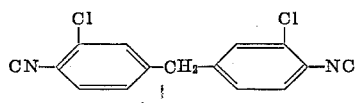

The residue is recrystallised from benzine/toluene. Yield: 58 parts by weight of 3,3'-dichloro-4,4'-diisocyano-diphenylmethane. M.P. 116–118° C.

(12) 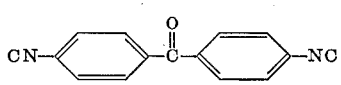

A brown resin remains as the residue. Yield: 110 parts by weight of crude 4,4'-diisocyano-benzophenone; the pure compound can be obtained by chromatography on aluminum oxide.

(13) 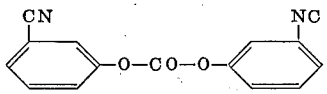

The residue is an oil which cannot be distilled. Yield: 130 parts by weight of crude 3,3'-diisocyano-diphenyl carbonate.

(14) 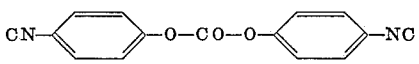

The residue is triturated with ether and filtered off with suction. Yield: 120 parts by weight of 4,4'-diisocyano-diphenyl carbonate. M.P. 107–120° C. (decomp.).

(15) 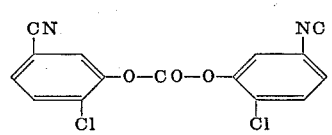

The residue is triturated with ether and filtered off with suction. Yield: 145 parts by weight of 2,2'-dichloro-3,3'-diisocyano-diphenyl carbonate. M.P. 127–130° C. (decomp. above 105° C.).

(16) 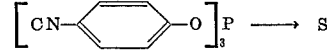

The residue is dissolved in 1:4 methylene chloride/toluene and filtered through aluminium oxide. Yield: 40 parts by weight of tri-O,O,O-[-p-isocyano - phenyl]thiophosphate. M.P. 120–122° C.

(17) 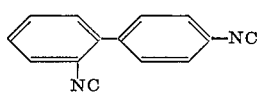

The residue is recrystallised twice from benzine. Yield: 63 parts by weight of 2,4'-diisocyano-diphenyl. M.P. 95–97° C.

(18) 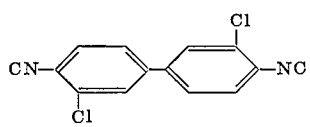

The residue is recrystallised from toluene/benzine. Yield: 123 parts by weight of 4,4'-diisocyano-3,3'-dichloro-diphenyl. Decomp. point >300° C.

(19) 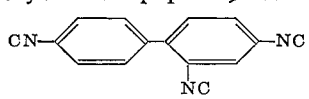

The residue is ground with 200 parts by weight of ether and thoroughly filtered off with suction. Yield: 62.5 parts by weight of 2,4,4'-triisocyano-diphenyl. Decomp. point >100° C.

(20) 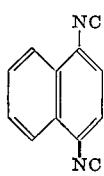

The residue is triturated with ether and filtered off with suction. Yield: 45 parts by weight of 1,4-naphthylene diisocyanide. M.P. 110–112° C.

(21) 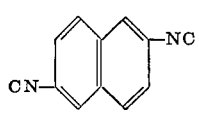

The residue is finely triturated with methanol and filtered off with suction. Yield: 60 parts by weight of 2,7-naphthylene diisocyanide. M.P.>280° C. (decomp.).

(22) 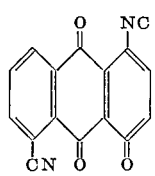

The residue is recrystallised from cyclohexane. Yield: 35 parts by weight of 1,5-diisocyano-anthraquinone. M.P. 90–92° C. (decomp.).

(23) 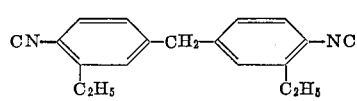

The residue is extracted with ether and the solution is evaporated. Yield: 220 parts by weight of 3,3'-diethyl-4,4'-diisocyano-diphenylmethane. M.P. 83–84° C.

(24) 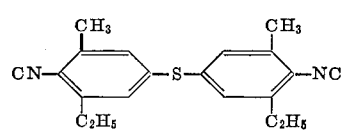

The residue is triturated with methanol and filtered off with suction. Yield: 80 parts by weight of 3,3'-dimethyl-4,4'-diisocyano-5,5'-diethyl-diphenyl thioether. M.P. 62–65° C.

We claim:
1. A method for controlling pests and fungi comprising contacting with an active amount of a compound of the formula

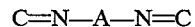

wherein A is a member selected from the group consisting of naphthylene, biphenylene, 3,3'-dichloro biphenylene, 3,3-di-lower alkyl biphenylene, 2-cyano biphenylene, 2,2'-di-lower alkoxy biphenylene, phenylene, tri-lower alkyl phenylene, di-lower alkyl phenylene, tetrachlorophenylene

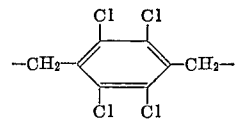

lower alkyl-trichlorophenylene, lower alkoxy phenylene, and two phenyl radicals connected to each other by a bridge inclusive of —CH$_2$—, —O—, —S—, —S—S—, —O—CO—O—, and —CO—; the two phenyl radicals being identically defined as members selected from the group consisting of phenylene, lower alkyl phenylene, and di-lower alkyl phenylene.

2. A method for controlling pests which comprises applying to said pests a pesticidal amount of a polyisonitrile of the formula

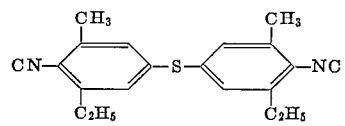

3. A method for controlling pests which comprises applying to said pests a pesticidal amount of a polyisonitrile of the formula of claim 1 wherein A is a member selected from the group consisting of a diphenylene, diphenylmethane, naphthylene, diphenylsulfide, and diphenyl carbonate.

4. A method for controlling pests which comprises applying to said pests a pesticidal amount of a polyisonitrile of the formula

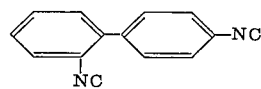

5. A method for controlling pests which comprises applying to said pests a pesticidal amount of a polyisonitrile of the formula

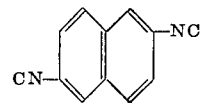

6. A method for controlling pests which comprises applying to said pests a pesticidal amount of a polyisonitrile of the formula

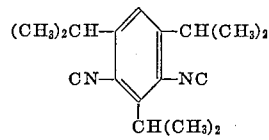

7. A method for controlling pests which comprises applying to said pests a pesticidal amount of a polyisonitrile of the formula

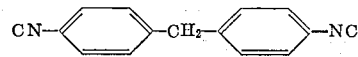

8. A method for controlling pests which comprises applying to said pests a pesticidal amount of a polyisonitrile of the formula

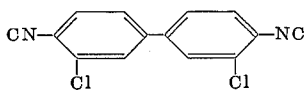

9. A method for controlling pests which comprises applying to said pests a pesticidal amount of a polyisonitrile of the formula

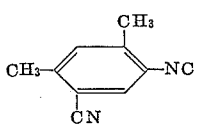

References Cited by the Examiner

UNITED STATES PATENTS

| | | | |
|---|---|---|---|
| 3,012,932 | 12/1961 | Bussert | 167—22 |
| 3,164,515 | 1/1965 | Homeyer et al. | 167—30 |
| 3,180,890 | 4/1965 | Enders et al. | 260—566 |
| 3,190,918 | 6/1965 | Hoetschmidt | 260—566 |
| 3,201,443 | 8/1965 | Malz et al. | 260—461 |

OTHER REFERENCES

Chem. Abstracts 60, p. 10557g (abstract of Belgium 627,486, published July 24, 1963) (April 27, 1964).

LEWIS GOTTS, *Primary Examiner.*

SHEP K. ROSE, *Assistant Examiner.*

UNITED STATES PATENT OFFICE
CERTIFICATE OF CORRECTION

Patent No. 3,278,371 October 11, 1966

Ivar Ugi et al.

It is hereby certified that error appears in the above numbered patent requiring correction and that the said Letters Patent should read as corrected below.

Column 6, in the first table, third column line 5 thereof, insert -- 60 --.

Signed and sealed this 5th day of September 1967.

(SEAL)
Attest:

ERNEST W. SWIDER
Attesting Officer

EDWARD J. BRENNER
Commissioner of Patents